United States Patent [19]

Zuercher

[11] Patent Number: 5,090,645
[45] Date of Patent: Feb. 25, 1992

[54] CABLE STACKING MEMBER

[75] Inventor: John L. Zuercher, Austin, Tex.

[73] Assignee: Minnesota Mining and Manufacturing Company, St. Paul, Minn.

[21] Appl. No.: 576,063

[22] Filed: Aug. 31, 1990

[51] Int. Cl.$^5$ .............................................. F16L 3/04
[52] U.S. Cl. .................................... 248/68.1; 248/71; 248/74.2; 24/336; 439/719; 174/166 R; 174/175
[58] Field of Search ............... 248/71, 544, 546, 547, 248/68.1, 74.1, 74.2, 74.5, 316.1, 316.6, 316.7; 24/336; 439/719; 174/164, 166 R, 175

[56] References Cited

U.S. PATENT DOCUMENTS

| D. 207,057 | 2/1967 | Palmer | 174/175 |
|---|---|---|---|
| 2,125,770 | 8/1938 | Dabroski | 248/547 |
| 2,723,815 | 11/1955 | Browning | 248/547 |
| 3,231,076 | 1/1966 | Freiman | 24/336 |
| 3,345,029 | 10/1967 | Palmer | 248/547 |
| 3,498,575 | 3/1970 | Downing | 248/71 |
| 3,626,553 | 12/1971 | Darney | 24/336 |
| 3,651,449 | 3/1972 | Hall | 248/74.2 |
| 4,119,285 | 10/1978 | Bisping et al. | 248/72 |
| 4,655,423 | 4/1987 | Schavilje | 248/71 |
| 4,682,748 | 7/1987 | Freudenmann et al. | 248/73 |
| 4,903,920 | 2/1990 | Merritt . | |
| 4,917,340 | 10/1988 | Juemann et al. | 248/74.2 |

FOREIGN PATENT DOCUMENTS

| 2431834 | 7/1974 | Fed. Rep. of Germany . | |
| 2622136 | 5/1976 | Fed. Rep. of Germany . | |
| 1311393 | 10/1962 | France | 248/68.1 |
| 465687 | 1/1969 | Switzerland | 248/68.1 |

*Primary Examiner*—Ramon O. Ramirez
*Assistant Examiner*—Robert A. Olson
*Attorney, Agent, or Firm*—Gary L. Griswold; Walter N. Kirn; John C. Barnes

[57] ABSTRACT

A cable stacking member and positioning device comprising a support member having a plurality of elongated slots stacked on a base plate for retaining electrical cables or wires. The member is formed of a plastic material and has a provision for securing and positioning the cable stacking member to a framing member.

20 Claims, 3 Drawing Sheets

CABLE STACKING MEMBER

BACKGROUND OF THE INVENTION

1. Field of the Invention

The present invention generally relates to wire or cable fasteners, and more particularly to wire or cable stacking devices useful for securing and properly positioning a plurality of cables or other elongated articles, i.e. tubes, conduits, onto a mounting surface in space restricted environments.

2. Description of the Prior Art

Generally, when routing wires or cables throughout a building, the practice has been to use metal conduit or to run nonmetallic insulated electrical wires or cables, hereinafter referred to as "cables," along the framing members of the building and to secure them with metal or plastic staples. The framing members usually consist of wood or metal studs, joists and rafters which support the walls and ceiling of a building. The staples are generally placed every three to five feet along each cable to be secured. If several cables must be routed together in the same area, they are usually positioned side by side on the framing member. However, a staple will generally only fit over a single electrical cable, at the most two, so many staples must be driven into the framing member if several cables are routed together. This can be a time consuming chore. The number of cables that can fit on the framing member is also limited at present by the size of the cable and the width of the framing member.

In the construction industry, metal staples or plastic clips have been used to secure electrical cables for a number of years. However, there are several disadvantages to securing electrical cables in this way. For example, when several cables are secured on a wooden framing member with staples, some of the cables must be placed close to the edges of the framing member. This makes the cables more susceptible to damage if a nail driven into the framing member misses the framing member when installing wall and ceiling panels. Nails may be driven later into the walls for various reasons, such as for hanging decorations or for supporting shelving, etc. In addition to the damage that may result to the electrical cable, personal injury may also result due to electric shock when the nail pierces the insulation of a cable. Also, an electrical power outage can result if the nail causes a short circuit, or breaks a wire. Shorted conductors may also cause a fire resulting in extensive damage to the structure.

The staples used to secure cables on the framing members can damage the cables as well. The staples may cut the cable's insulation if they are improperly positioned over the cable, or if they are driven too far into the stud. The use of a plastic clip secured with two nails is less likely to cause damage, but care must still be taken to ensure that the nails holding the plastic clip are not driven through the cable. A damaged cable must be replaced or repaired, which may cause delays in completion of the wiring system and also result in increased costs. If the damage from an improperly placed staple goes undetected when installing the wiring, the damage may be very difficult to find and correct later after wall panels are attached.

Staples can be difficult to install in tight places, such as when neighboring studs are positioned close together for framing a window or doorway, making it difficult to use a hammer to drive the staple into the stud over the cable. Pneumatic staple guns are available to drive the staples, but they are difficult to set up properly and are not commonly used by electrical contractors.

Accordingly, the present invention provides a cable stacking member that will secure and locate the cables of an electrical system to the framing members in a way that reduces the possibility of the cables being damaged by nails.

Also, the invention provides a cable fastening device that allows easy routing of cables, and positioning the same to restrict the possibility of damage to the cables during installation, finishing of walls or after construction.

Further, the invention provides a cable stacking device that allows a plurality of electrical cables to be secured to the framing members in a neat and orderly manner with a minimum amount of effort.

Additionally, the invention provides a cable stacking member that is easily positioned and aligned on a framing member so that the electrical cables are automatically centered on the studs where they are less likely to be damaged.

The present invention also provides a fastener that can be used anywhere it is necessary or desirable to secure a plurality of elongated articles.

SUMMARY OF THE INVENTION

The foregoing features of the present invention are achieved by a cable stacking member comprising a fastener element supported on a base plate. The fastener element is comprises of a standard, post or support member, and a plurality of elongate extensions. The extensions are arranged in spaced, approximately parallel relationship and are cantilever mounted to the support member so that elongate slots are formed between adjacent extensions. The cable stacking member is attached to a mounting surface and a plurality of electrical cables, wires, or other elongate articles can be retained within the slots. The slots are constructed to hold a range of cable sizes, and may have bumps, dimples or ridges or other projections on the opposed surfaces of the extensions to prevent smaller cables from easily moving along the extensions. The ends of the elongate extensions have shoulders or projecting ribs which serve to narrow the open end of the slot or space between extensions to a width smaller than the thickness of the cable.

The cable stacking member can be molded of a plastic material that is sufficiently flexible to allow the extensions to spread apart and permit the cable to enter the slot, and then close around the cable, thereby securing it in the slot.

The fastener element is attached to the base plate and extends therefrom so that the slots are centered on the base plate and are parallel and stacked perpendicular to the plane of the base plate. The base plate can be sized to permit proper spacing and positioning of the cable stacking member on a framing member. The cable stacking member can be attached to the mounting surface using common fasteners such as nails, screws, staples or other similar means, or by adhesives or mounting tapes.

BRIEF DESCRIPTION OF THE DRAWING

The invention will be further described by reference to the accompanying drawing, wherein.

DESCRIPTION OF THE PRESENTLY PREFERRED EMBODIMENT

Figure 1:
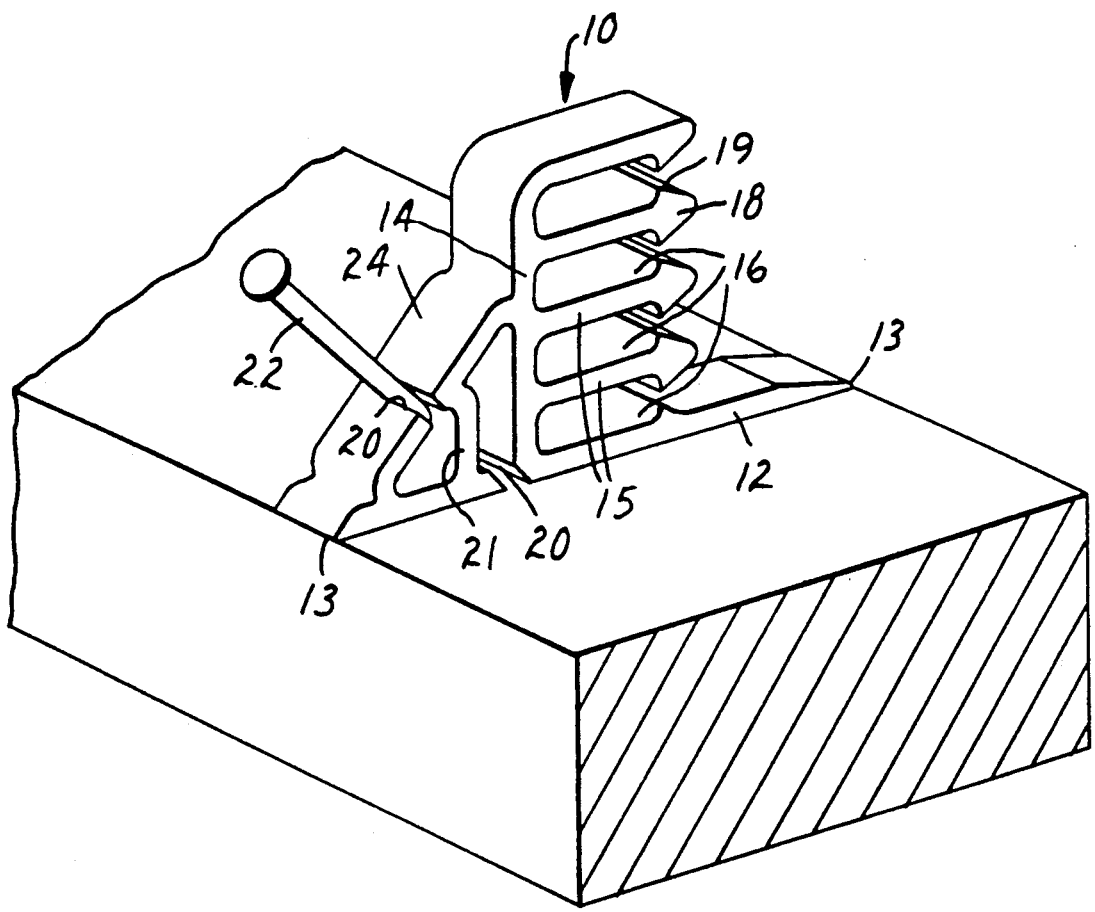
FIG. 1 is a perspective view of the cable fastener positioned and aligned on a wooden framing member with a nail for mounting.
Figure 2:
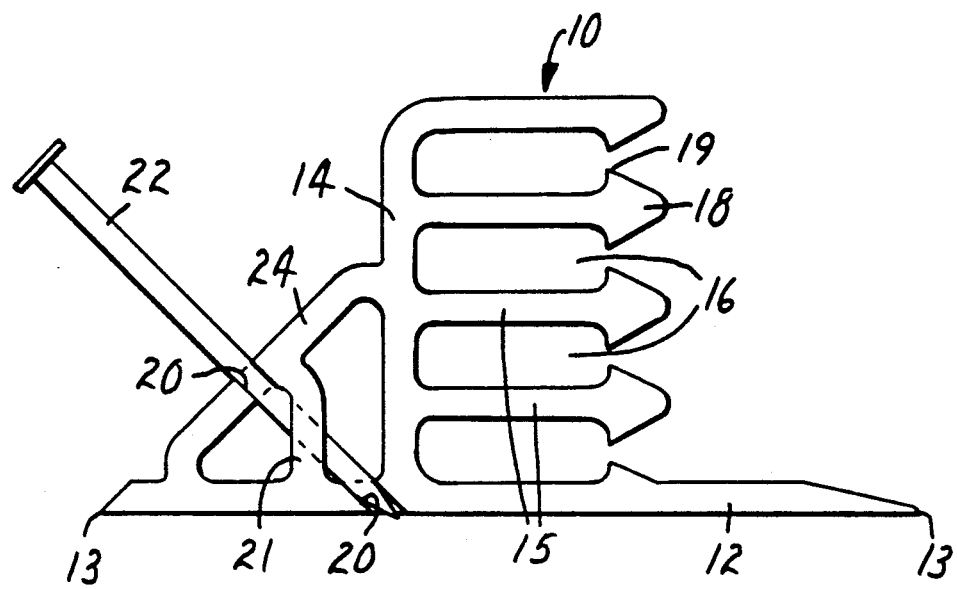
FIG. 2 is a side elevational view of the cable stacking member in FIG. 1.

Like elements of the different embodiments depicted in the figures will be labeled with like numbers. With reference now to the figures, and in particular to FIG. 1, there is depicted a cable stacking member 10 comprises a support member 14 in the form of a beam, post or standard attached to and extending perpendicular from a base plate 12 having a generally flat surface. A plurality of integral elongate extensions 15 project, substantially perpendicular, from the support member 14. The extensions 15 are substantially parallel to each other and are all arranged in the same plane, similar to the teeth of a comb. The spaced extensions 15 define slots 16 therebetween for retaining a plurality of electrical cables or other elongated articles. Each slot 16 is approximately 0.8 inch (2 cm) long and between about 0.2 and 0.3 inch (0.5 and 0.8 cm) wide to accommodate multi-size wire cable. The length and width of the slot and the material thickness between the slots is selected for the desired application and the desired beam strength and flexibility required for the application. Arrowhead-like projections 18 are integral with, and form the free end of, each extension 15. The barbs 19 of each projection 18 serve to form a shoulder which will partially close the entrance to the slot 16 to a width of approximately 0.07 inch (0.14 cm) so that a retained cable will not inadvertently be released. The tip of each projection 18 is tapered so that neighboring projections 18 form guides for directing the cables into the slots 16.

Support member 14 is preferably integral with the base plate 12 so that the slots 16 are centered and stacked vertically on base plate 12. A function of the base plate 12 is to facilitate the positioning and aligning of the fastener 10 on a mounting surface. In FIG. 1, cable stacking member 10 is shown ready for mounting on a conventional dimensioned 2×4 stud 26. The length of the base plate 12 approximates the width of a dimensioned 2×4 stud used in framing a majority of the frame type buildings. By positioning cable stacking member 10 on the 2×4 stud 26 with ends 13 of base plate 12 aligned with the edges of the stud 26, and the flat surface against the stud 26, the center of the slots 16 will be centered on stud 26. Base plate 12 can be made to fit construction framing members, or studs, of other widths as well. It is important however, that the entrance end of the slots 16 or the closed end of the slots 16 are one and one quarter inches (1.25 inches or about 3.8 cm) from an end of the base.

The cable stacking member 10 is attached by means of an integral brace 24 which extends diagonally at approximately a 45 degree angle between one end of the base plate 12 and approximately the midpoint of support member 14. A brace segment 21 is integral with and positioned between the brace 24 and the base plate 12. A nail slot 20 is formed into each of the brace 24, the brace segment 21 and the base plate 12 in a linear relationship to each other and in a line approximately 90 degrees to brace 24. The nail slots 20 on brace 24 and base plate 12 open on one side of the cable stacking member 10, and nail slot 20 in brace segment 21 opens on the opposite side. Instead of molding the nail slots 20, when the member 10 is molded, holes can be drilled or punched through the brace 24, the brace segment 21 and the base plate 12 after molding or made in an extruded cut segment. The nail slots 20 are arranged so that a nail, screw or other axially driven elongate fastener can be passed through the cable stacking member 10 and driven into the mounting surface. The nail slots 20 are formed approximately half way through the width of the cable stacking member 10. The ends of the nail slots 20 are radiused and the width of each nail slot 20 is just slightly smaller than the diameter of the nail 22 so that the nail 22 is frictionally held by the walls forming the nail slots 20 to retain the fastener in the cable stacking member 10 during shipping and handling. Driving the nail 22 in at a slant to the base plate 12 allows the nail 22 to be more easily driven in with a hammer when the cable stacking member 10 is used in a confined location, as between studs 26 that are placed close together, or between a window or door frame and an adjacent framing member.

The cab)e stacking member 10 is approximately 0.5 inch (1.27 cm) wide, and 1.7 inch (4.4 cm) tall from the bottom of base plate 12 to the top of support member 14. The extensions 15 are about 0.1 inch (0.3 cm) thick to afford sufficient flexibility for permitting cables to enter the cable stacking member 10, and yet be strong enough to support the cables. The nail 22 is preferably a 6 penny common, about 2 inches (5 cm) long and about 0.113 to 0.115 inch (0.28 to 0.29 cm) in diameter, having a diamond shaped point, however other types and sizes of nails will also work.

Cable stacking member 10 is preferably injection molded of a polymeric material, such as reclaimed material. A suitable material is polypropylene. It can also be made by extruding and cutting polypropylene or any other suitable polymeric material. A material having a high temperature rating, at least a temperature rating of 60 degrees Celsius, and good impact resistant so that a misguided hammer blow will not easily break or shatter it, is preferred. Finally, the material should not become brittle at temperatures as cold as −18 degrees Celsius.

Figure 3:
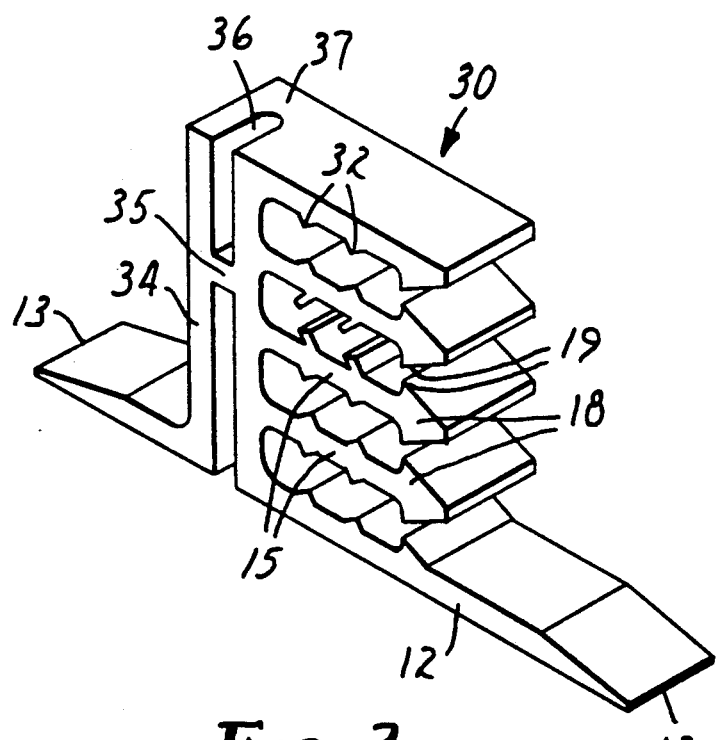
FIG. 3 is a perspective view of an alternative embodiment of the cable stacking member with optional projections formed in the walls of the slots.

FIG. 3 shows a perspective view of an alternative embodiment of the cable stacking member 10. Brace 24 and brace segment 21 are omitted from cable stacking member 30. A support member 34 has a thicker cross section and opposing deep slots for retaining the nail 22 to attach the cable stacking member 30 to a framing member. Nail slot 36 extends longitudinally through the length of support member 34 so that nail 22 is now inserted perpendicular to base plate 12. A plurality of webs 35 and 37 span nail slot 36 on alternate sides of support member 34 thus providing a space for a securing nail 22 to extend parallel to the support member. Additionally, bumps, dimples, ridges, teeth, or ribs defining projections 32 may be integrally formed on one or both of the opposed surfaces of extensions 15 to help secure the cables, particularly smaller cables and prevent them from sliding around in the cable stacking member. Projections 32 may be used on all or only a few of the extensions 15 depending on specific individual needs.

Figure 4:
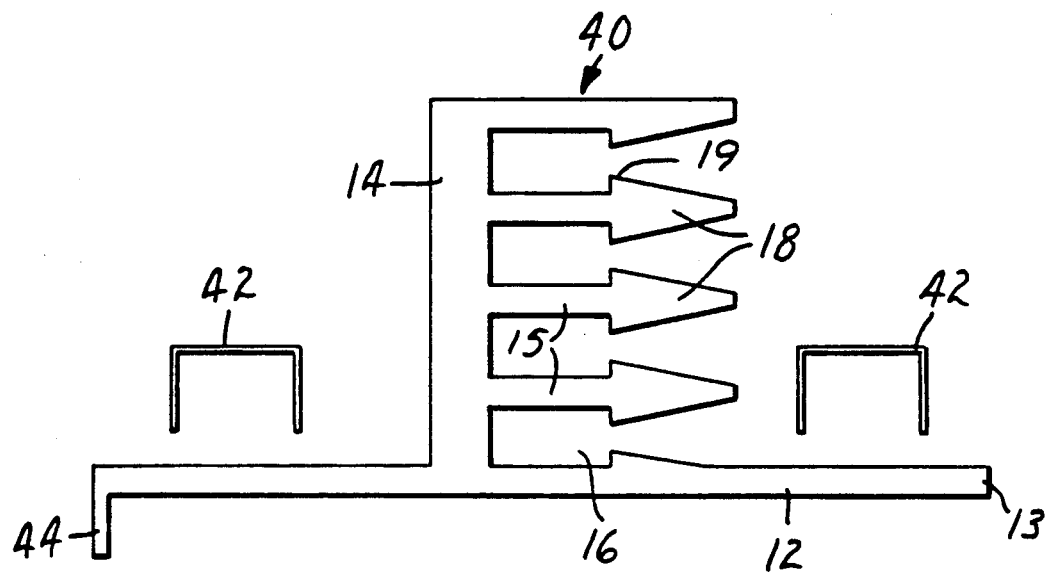
FIG. 4 is a side elevational view of another embodiment of the cable stacking member with staples shown as the means for attachment.

FIG. 4 shows another alternative to cable stacking member 10. Cable stacking member 40 is secured to a stud 26 by a plurality of staples 42 driven through base plate 12 for attaching the cable stacking member 40 to a framing member. The cable stacking member 40 also has a positioning tab 44 integrally molded at one end 13 of base plate 12 as an alternative method for quickly positioning the cable stacking member 40 on a stud 26. The positioning tab 44 projects from the base plate 12 in a direction opposite support member 14 and makes abutting contact with the edge of a stud 26, so that the cables will be centered on the stud 26 when the cable stacking member 40 is secured to the stud 26.

Figure 5:
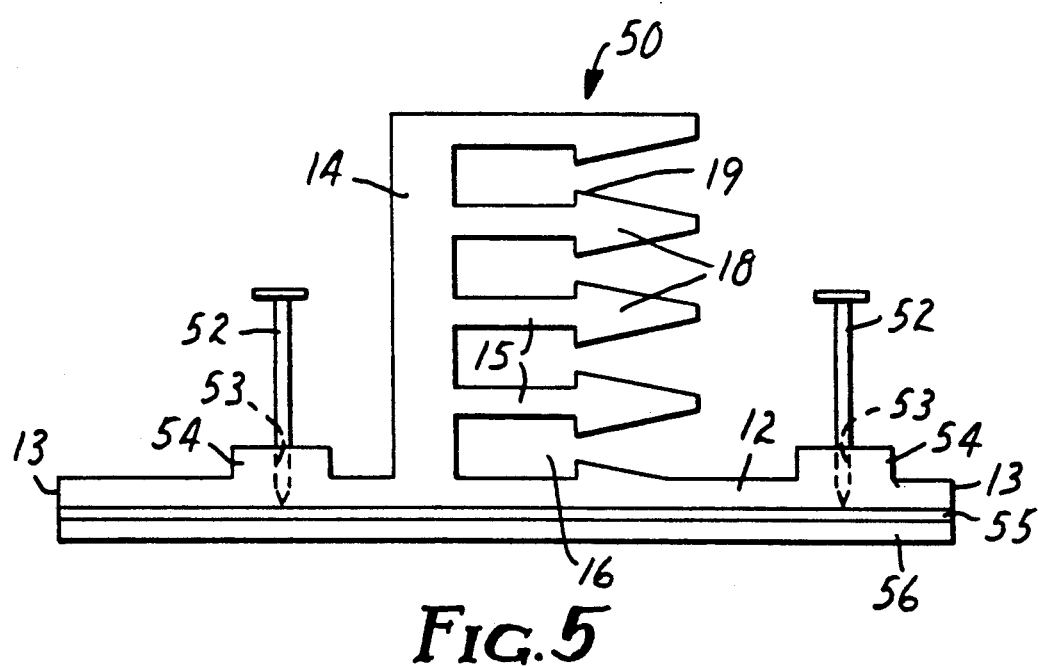
FIG. 5 is a side elevational view of another embodiment of the cable stacking member with a pair of fasteners retained in the apertures of raised bosses in the base plate.

Other methods of mounting cable stacking member 10 are illustrated in FIG. 5. First, a plurality of raised bosses 54 can be integrally molded into the base plate 12 for retaining nails 52 prior to securing the cable stacking member 50 to a stud 26. An aperture 53 is made in each boss 54 and base plate 12 that has a slightly smaller inside diameter than the outside diameter of the shaft of the nail 52 so that the nails 52 are securely held in readiness by boss 54 until it is driven into the stud 26. The boss 54 provides added strength and rigidity to the base plate 12, which may be a desirable advantage if large or heavy cables are being retained. Secondly, in place of the bosses and nails 52, or as an aid in positioning a cable stacking member on a framing member, a layer 55 of adhesive or a length of adhesive mounting tape may be applied to the surface of the base plate 12 and covered by a removable liner 56. The mounting tape may be a layer of pressure sensitive adhesive transfer tape having a removable protective liner, or a double coated pressure sensitive tape having a foam backing and a protective liner.

It is to be understood that by the use of a plurality of cable stacking members spaced along a framing member, a pathway is defined for the elongate article or articles, cables or whatever, to maintain them properly spaced from the edges of the framing members.

Although the invention has been described with reference to specific embodiments, this description is not meant to be construed in a limiting sense. The cable stacking members illustrated are formed to receive four cables running parallel and spaced from each other and spaced from the framing member supporting the base plate. The number of extensions may vary when the number of cables increases or decreases. The base plate is designed to maintain the stack of cables on the framing member whereby the edges of the cables will be 1.25 inch (3.17 cm) from either edge of the framing member. Various modifications of a disclosed embodiment, as well as alternative embodiments of the invention, will become apparent to persons skilled in the art upon reference to the description of the invention, without departing from the scope or spirit of the invention as defined in the appended claims.

I claim:

1. A cable stacking member for fastening and positioning wires and cables to a framing member comprising:
    a base plate having opposite surfaces and ends,
    a support member attached to said base plate and extending generally perpendicular from one surface thereof, said support member having at least one side, and
    a plurality of elongate extensions, said extensions having a first end and a second end, said first end of each extension being attached to said at least one side of said support member and said extensions projecting from said support member in spaced, substantially parallel relationship to each other, the spaces between adjacent extensions defining slots which are open on three sides for the retention of elongate articles and said extensions having means at their second ends for partially closing an open end of said slots to retain the elongate articles in said slots, said extensions and the resulting slots therebetween being generally centrally located on said base plate, and
    means for attaching said cable stacking member to a framing member.

2. The member according to claim 1 wherein said means for attaching said cable stacking member to a framing member comprises one of a fastener receiving aperture and fastener, and adhesives.

3. The member of claim 1 wherein said means for attaching said cable stacking member to a framing member comprises a brace member, said brace member providing means for retaining an axially driven elongate fastener at an acute angle to said base plate.

4. The member of claim 1 wherein a tab extends downward from an end of said base plate toward a framing member for aligning and positioning said base plate to the edge of the framing member.

5. The member of claim 1 wherein said extensions have projections on the lateral surfaces defining said slots for preventing the retained electrical cables from moving in said slots.

6. The member of claim 1 wherein said base plate has opposite ends, said ends of said base plate afford aligning and positioning means for said base plate on a 2×4 stud and said slots are centered on said base plate.

7. The member of claim 1 wherein said means for attaching said stacking member comprises an aperture extending longitudinally through said support member for retaining a nail for attaching said cable stacking member to a framing member.

8. A cable stacking member for fastening and positioning wires and cables to a framing member comprising:
    an elongate support member having means defining opposite sides and a base plate;
    said base plate having opposite surfaces and said support member extending from a surface thereof;
    a plurality of elongate extensions having first and second ends, said first end of each extension being attached to and extending from one of said sides of said support member;
    said extension being arranged in the same plane and substantially parallel to one another and parallel to said base plate;
    the spaces between adjacent extensions defining slots for the retention of electrical cables;
    said extensions having enlarged projections at their second ends, said projections having converging surfaces extending away from said slots;
    said projections having portions partially closing the open end of said slots to restrict the cables from being easily released after they are positioned in a slot between said extensions;
    said converging surfaces of adjacent projections aiding in guiding the electrical cables into said slots; and means for attaching said base plate to a framing member.

9. The member of claim 8 wherein a tab extends downward from an end of said base plate on the surface opposite said support member toward the framing member for aligning and positioning said base plate to the edge of the framing member.

10. The member of claim 8 wherein said base plate has opposite ends, said ends of said base plate afford aligning and positioning means for said base plate on a 2×4 stud and said support member being positioned on said base plate to center said slots on said base plate.

11. The member of claim 8 wherein at least one of said extensions have projections projecting from a surface into said slots for restricting the retained electrical cable from moving in said slot.

12. The member of claim 8 wherein an integral brace member extends from the approximate midpoint of said support member, on the side opposite said extensions, and at an acute angle to said support member, toward an end of said base plate.

13. The member of claim 8 wherein said cable stacking member is formed of polypropylene.

14. A cable stacking member for fastening and positioning wires and cables to a framing member comprising:
   a generally elongate support member and a base plate;
   said base plate having opposite surfaces and said support member being attached to one surface thereof;
   a plurality of elongate extensions having first and second ends, said first end of each extension attached to said support member;
   said extensions being arranged in the same plane and substantially parallel to one another and parallel to said base plate;
   the spaced between adjacent extensions defining slots for the retention of electrical cables;
   said extensions having triangular arrowhead like projections at their second ends, said projections having converging surfaces pointing away from said slots;
   said arrowhead-like projections having barb-like portions partially closing the open end of said slots to prevent the cables from being easily released after they are secured in said extensions;
   said converging surfaces of adjacent arrowhead-like projections aiding in guiding the electrical cables into said slots; and
   means for attaching said base member to a framing member, said means for attaching including an integral brace member extending from the approximate midpoint of said support member, on the side opposite said extensions, and at an acute angle to said support member, toward an end of said base plate and a brace segment which extends from the midpoint of said brace member to said base plate.

15. The member of claim 14 wherein aperture means are provided in said brace member, said brace segment, and said base plate in a linear relationship perpendicular to said brace member for receiving a nail inserted therein to secure said base plate to a framing member.

16. A molded cable stacking member for fastening and positioning a plurality of electrical cables to the framing members of a building, comprising:
   a fastener element and a base plate;
   said base plate having opposite sides and opposite ends;
   said fastener element comprising an elongate support member having opposite sides and a plurality of elongate extensions;
   said extensions each having first and second ends, said first ends attached to one side of said support member;
   said extensions arranged in the same plane and approximately parallel to one another;
   the space between adjacent extensions defining slots for the retention of electrical cables;
   said extensions having means for guiding cables into said slots and for partially closing the open end of said slots to prevent the retained cables from being easily released;
   said fastener element is attached on one side of said base plate such that said slots are stacked perpendicular to and centered on said base plate and said extensions are parallel with said base plate, said extensions extending toward an end of said base plate;
   at least one end of said base plate being spaced from an end of said slots by at least one and one quarter inches; and
   means for attaching said base plate to a framing member.

17. The member of claim 16 wherein a tab extends from a said one end of said base plate on a side opposite said fastener element to abut an edge of a framing member for aligning and positioning said base plate on the framing member.

18. The member of claim 16 wherein said extensions have projections on opposed surfaces for restricting the retained electrical cables from moving in said slots.

19. The member of claim 16 wherein said means for attaching said base plate comprises an adhesive coating on the surface of said base plate opposite said fastener element.

20. The member of claim 16 wherein said cable stacking member is formed of a plastic material having a high temperature rating and impact resistance.

* * * * *